United States Patent [19]

Chang et al.

[11] 4,118,113

[45] Oct. 3, 1978

[54] SECOND ORDER BIREFRINGENT ACOUSTO-OPTIC DEVICE

[75] Inventors: I-Cheng Chang, Sunnyvale; David L. Hecht, Menlo Park, both of Calif.

[73] Assignee: Itek Corporation, Lexington, Mass.

[21] Appl. No.: 739,230

[22] Filed: Nov. 5, 1976

[51] Int. Cl.$^2$ .............................................. G02F 1/33
[52] U.S. Cl. ................................................ 350/358
[58] Field of Search ........................... 350/161 W, 358

[56] References Cited

U.S. PATENT DOCUMENTS 4,037,933  7/1977  Yano et al. ................. 350/161 W

OTHER PUBLICATIONS

Warner et al., "Acousto-optic light deflectors using paratellurite", J. Appl. Physics., vol. 43, No. 11, Nov. 1972, pp. 4489–4496.

Yano et al., Appl. Phys. Letters, vol. 26, No. 12, pp. 689–691, 15 Jun., 1975.

*Primary Examiner*—William D. Larkins
*Attorney, Agent, or Firm*—Homer O. Blair; Robert L. Nathans; Gerald H. Glanzman

[57] ABSTRACT

An acousto-optic deflector that utilizes second order diffraction in a birefringent crystal provides doubled resolution while maintaining high diffraction efficiency. For the second order birefringent deflector employing a paratellurite crystal, 1200 spot resolution was achieved with a 24 MHz bandwidth and 25 $\mu$ sec access time. This maximum number of spots is twice that obtainable in a conventional first order acousto-optic deflector.

5 Claims, 4 Drawing Figures

SECOND ORDER BIREFRINGENT ACOUSTO-OPTIC DEVICE

BACKGROUND OF THE INVENTION

This invention relates to the type of laser beam deflector that utilizes the diffraction of light by acoustic waves. In such acousto-optic deflectors an electrical input signal is fed to a transducer that is bonded to a deflector medium. The transducer can be excited and launches acoustic waves into the medium. Under appropriate conditions, an incident laser beam may be deflected by the acoustic wave to many diffraction orders. The angle of deflection can be scanned by changing the frequency of the acoustic waves.

In a laser deflector, one of the most important performance parameters is the resolution, or maximum number of angular positions, which is defined as the ratio of total deflection angle to the optical divergence of the laser beam. For conventional acousto-optic deflectors where Bragg diffraction in the first order is always use, the resolution N is equal to the product of total scanning frequency bandwidth $\Delta f$ and the acoustic transit time $\tau$ across the optical aperture, i.e., $N = \Delta f \tau$. Bandwidth is limited by acoustic attenuation at higher frequency, and the acoustic transit time is usually limited by the access time requirement or spatial constraint. One method to improve the resolution is the use of optically cascaded deflectors which was reported by Watson and Adler in a paper published in 1969 IEEE Conference on Laser Engineering and Applications. For efficient operation of the deflectors, special beam steering had to be used and the cells had to be critically aligned. The complexity of this approach makes it less attractive. In a paper entitled "Continuous Deflection of Laser Beams," which appears in Applied Physics Letters, Vol. 10, of January, 1967, pages 48–51, Lean et al. reported the deflection of laser beam by acoustic waves in birefringent $LiNbO_3$ crystal. At a specific acoustic frequency as determined by the crystal birefringence and optical wavelength, the momentum matching condition for the acousto-optic diffraction is approximately satisfied over a broad range of acoustic frequencies. This has been referred to as the 90° phase matching birefringent diffraction since in this case the diffracted light wave vector is perpendicular to the acoustic wave vector. Based on the same concept, Warner et al. described the operation of a broadband acousto-optic deflector using the circular birefringence in paratellurite; this appeared in the Journal of Applied Physics, Vol. 43, November of 1972, pages 4489–4495. The authors also reported that due to rediffraction the peak diffraction efficiency to first order is limited to below 50%.

BRIEF SUMMARY OF THE INVENTION

In the present invention a method is provided to achieve double resolution while maintaining high diffraction efficiency in a single laser beam deflector by utilizing second order acousto-optic diffraction in an anisotropic medium. The key point of this method is that the first and second order diffraction are nearly degenerately phase-matched; enabling high diffraction into the second order. Since the total angle for the second order of deflection is equal to twice that of the first order, the deflector resolution is doubled for the same scanning frequency bandwidth and access time. In a further embodiment of the present invention, the direction of the laser beam is chosen to be making an angle with respect to the optic axis of a birefringent crystal for the selection of midband frequency.

DESCRIPTION OF THE PREFERRED EMBODIMENTS

Figure 1:
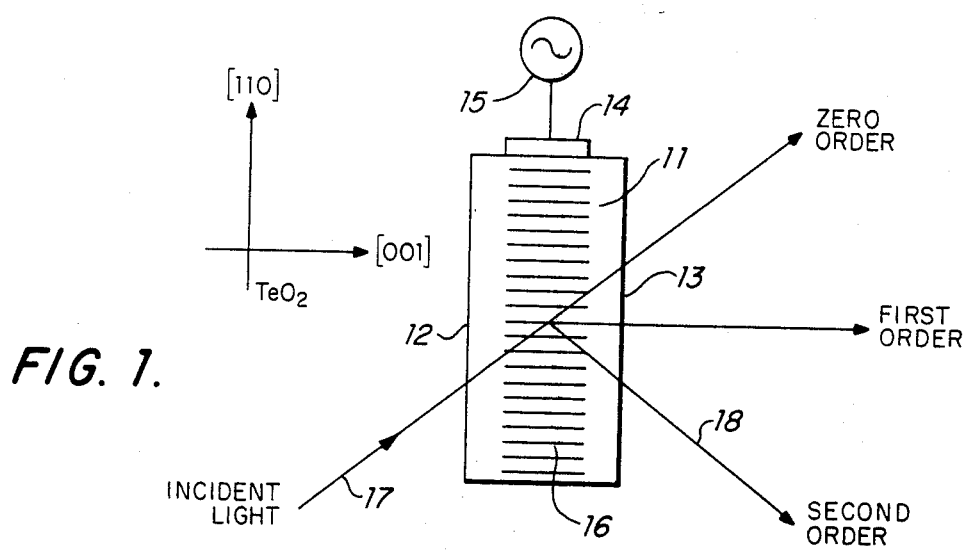
FIG. 1 is a schematic diagram of a second order birefringent acousto-optic deflector.

Referring to FIG. 1, there is shown a schematic of a second order birefringent acousto-optic device. The device comprises an anisotropic medium 11, for example, a $TeO_2$ crystal, provided with input and output end surfaces 12 and 13, respectively. The medium 11 is oriented with the [110] axis of the $TeO_2$ crystal in the vertical direction and the [001] axis in the horizontal direction. An acoustical transducer 14 is mounted in intimate contact with the medium 11 and is connected to a suitable tunable signal generator 15. The RF output of the signal generator 15 is fed to the transducer 14 and excites an acoustic shear wave 16 which is propagated along the [110] axis of the $TeO_2$ crystal. A right-hand circularly polarized laser beam 17 is incident on the input surface 12 and transmitted into the medium 11 near the optic axis and is diffracted by the acoustic wave. Under appropriate conditions, efficient diffraction of the laser beam occurs in the second order. The light in the second order diffraction appears as a deflected laser beam 18 that exists at the output surface 13. When the frequency of the signal generator 15 is varied, the direction of the deflected laser beam is accordingly changed. The device then acts as a laser deflector. The resolution of this configuration is equal to twice that of the conventional acousto-optic deflector since the second order diffraction is employed, i.e., $$N = 2\Delta f \tau \qquad (1)$$

where $N$ = the resolution, $\Delta f$ = total scanning frequency bandwidth, and $\tau$ = acoustic transit time across the optical aperture.

Figures 2A, 2B:
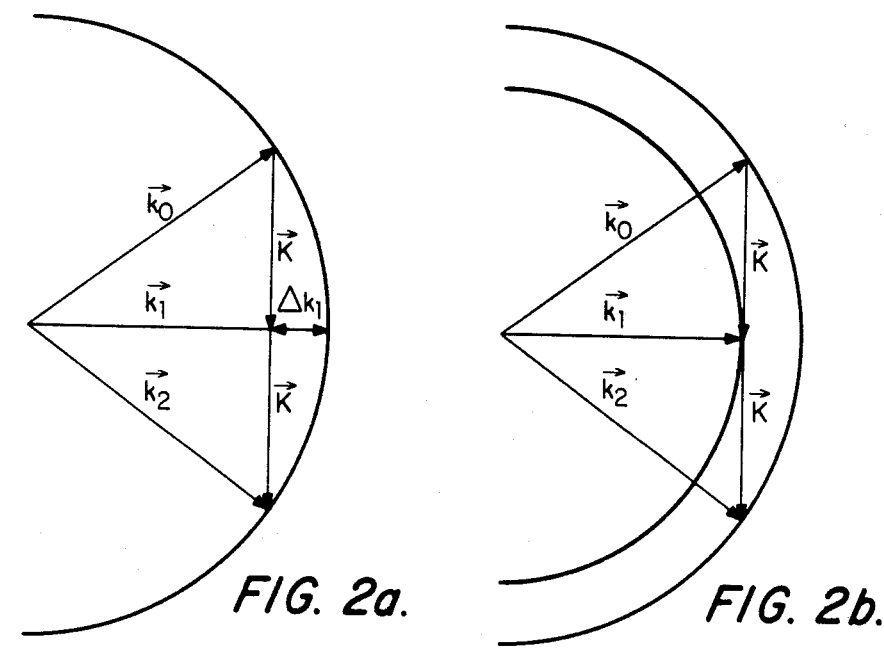
FIG. 2(a) is the diagram of the wave vectors for second order acousto-optic diffraction in an isotropic medium.
FIG. 2(b) is the diagram of the wave vectors for second order acousto-optic diffraction in a birefringent crystal.

The difference between conventional acousto-optic devices and the second order birefringent device described here is best illustrated by the diagram of wave vectors construction. FIG. 2(a) shows the wave vector diagram for an acousto-optic diffraction in an isotropic medium. Although exact wave vector matching is achieved at the band center in second order, there is a substantial wave vector mismatch for the intermediate first order process. The overall diffraction efficiency to the second diffraction order is low, hence the use of second order diffraction in an isotropic medium is impractical. On the other hand, the overall diffraction efficiency for a second order birefringent deflector can be high. FIG. 2(b) shows the wave vector diagram for the acousto-optic diffraction near 90° phase matching condition in a birefringent crystal. Note that in this case the acoustic wave vectors for the midband frequency are degenerate in magnitude and direction, thus enabling high overall diffraction efficiency into the second order.

A complete wave analysis of the second order birefringent diffraction process was made. At midband frequency the first and second order process are exactly phase matched. The diffraction efficiency in second order as a function of drive power is then given by $$I_2/I_o = \sin^4[\pi^2 P/4P_m]^{\frac{1}{2}} \quad (2)$$

where $P$ is the acoustic power, $P_m = \lambda_o^2 H/M_2 L$, $\lambda_o$ is the free space wavelength, $H$ is the transducer height, $L$ is the interaction length and $M_2$ is the acousto-optic figure of merit. At $P = P_m$, 100% diffraction efficiency into the second order is obtainable.

Figure 3:
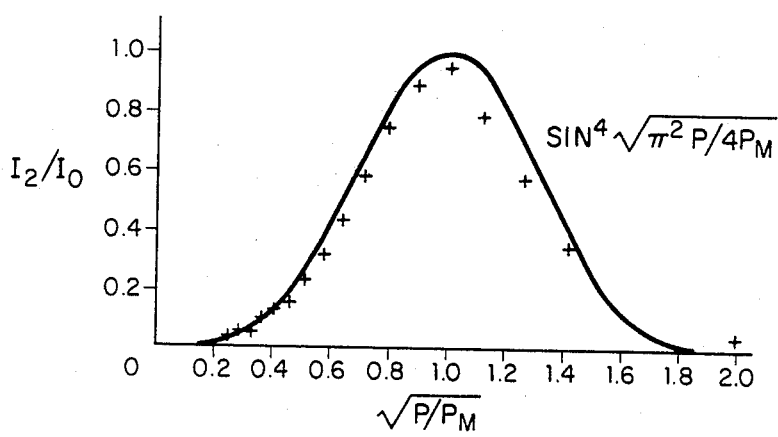
FIG. 3 shows the theoretical and experimental midband efficiency of a second order paratellurite deflector as a function of normalized drive power. The solid curve is a plot of Eq. 2, the pluses (+) indicate measured results.

Experiments were performed on a second order birefringent deflector using TeO$_2$ as the medium. The arrangement is the same as shown in FIG. 1 with a He-Ne laser at 6328fA. Maximum light intensity was obtained at the 90° phase-matching frequency of 37.4 MHz. The measured diffracted efficiency $I_2/I_o$ is shown in FIG. 3 as a function of $(P/P_m)^{\frac{1}{2}}$, which is in good agreement with Eq. (2). The resolution of the second order birefringent deflector was also measured. The device had a total scanning frequency bandwidth of 24 MHz and a 25 μsec access time. The resolution of the deflector was found to be 1200 spots, which is twice that obtainable in the first order.

It should be noted that the mid-band acoustic frequency $f_o$ of the deflector for optical wavelength $\lambda_o$ is $$f_o = V/\lambda_o \sqrt{2n\Delta n} \quad (3)$$

where $V$ is the acoustic velocity, $n$ is the refractive index and $\Delta n$ is the effective birefringence of the crystal. In the configuration shown in FIG. 1, the circular birefringence in TeO$_2$ is utilized. If the linear birefringence of a crystal such as TeO$_2$ is utilized, the mid-band acoustic frequency is in general too high for practical applications. For an incident laser beam is incident at an angel $\theta$ with respect to the optic axis. The effective birefringence is given by $$\Delta n = (n_e - n_o)\sin^2\theta \quad (4)$$

where $n_e$ and $n_o$ are indices for the ordinary and extraordinary light propagated perpendicular to the optic axis. This permits the choice of lower mid-band frequency of the second order birefringent deflector.

What is claimed is:

1. A second order acousto-optic device comprising a birefringent medium, means for generating and propagating acoustic waves in the said medium for providing nearly degenerate phase matching for first and second diffraction orders over a total scanning frequency bandwidth $\Delta f$, and an acoustic transit time $\tau$, across the optical aperture of said medium, means for directing a laser beam through said medium to be diffracted by said acoustic waves, means for selecting the mid-band acoustic frequency of the said acoustic waves to achieve degenerate phase matching for deflecting the said beam into the second order with high efficiency, and means for utilization of said second order beam to provide doubled resolution, $2\Delta f/\tau$, while maintaining high diffraction efficiency.

2. A device as recited in claim 1 wherein the said midband acoustic frequency is selected by choosing the incident angle of the said laser beam with respect to the optic axis of the said medium.

3. A device as recited in claim 1 wherein the said medium comprises a TeO$_2$ crystal, and wherein the acoustic waves are propagated in the [110] direction of the said TeO$_2$ crystal and the said laser beam is incident close to the optic axis of the said TeO$_2$ crystal.

4. In an acousto-optic deflector, a method for achieving doubled resolution while maintaining high diffraction efficiency by utilizing second order acousto-optic diffraction in a birefringent crystal comprising:

(a) propagating acoustic waves in said crystal;
   (b) directing a laser beam through said crystal to be diffracted by said acoustic waves; and,
   (c) selecting the mid-band frequency of the said acoustic waves to achieve degenerate phase matching for deflecting said beam into the second order, and
   (d) using said second order diffracted beam as the output of said acousto-optic deflector.

5. A method as recited in claim 4 wherein the crystal comprises a TeO$_2$ crystal and wherein the acoustic waves are propagated in the [110] direction of the said TeO$_2$ crystal and the said laser beam is directed to be incident close to the optic axis of said TeO$_2$ crystal.

* * * * *